United States Patent
Rutz

(10) Patent No.: US 10,073,723 B2
(45) Date of Patent: Sep. 11, 2018

(54) DYNAMIC RANGE-BASED MESSAGING

(71) Applicant: Oracle International Corporation, Redwood City, CA (US)

(72) Inventor: Andrew A. Rutz, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 15/177,253

(22) Filed: Jun. 8, 2016

(65) Prior Publication Data

US 2017/0357540 A1    Dec. 14, 2017

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 9/50 | (2006.01) |
| G06F 9/455 | (2018.01) |

(52) U.S. Cl.
CPC .......... *G06F 9/546* (2013.01); *G06F 9/45558* (2013.01); *G06F 9/50* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 6,515,963 | B1* | 2/2003 | Bechtolsheim | ......... H04L 47/21 370/229 |
| 2007/0156997 | A1* | 7/2007 | Boule | ................... G06F 12/023 711/170 |
| 2010/0088345 | A1* | 4/2010 | Utsuki | ................. G06F 3/0482 707/797 |

(Continued)

OTHER PUBLICATIONS

Damian Dechev, et al., "Lock-fee Dynamically Resizable Arrays", In Principles of Distributed Systems, 2006, pp. 142-156.

(Continued)

*Primary Examiner* — Chat Do
*Assistant Examiner* — William C Wood
(74) *Attorney, Agent, or Firm* — Robert C. Kowert; Meyertons, Hood, Kivlin, Kowert & Goetzel, P.C.

(57) ABSTRACT

Methods and systems for dynamic range-based messaging may include one or more processors configured to implement a dynamic range-based messaging system configured to receive, from respective producers of multiple producers, requests for indices to add respective messages to a contiguous message array. The system may assign, to the respective producers, next available indices. The system may populate the contiguous message array with messages from the respective producers at respective assigned indices. The system may compute a range of messages in the contiguous message array ready to be consumed, where the range starts at an initial index. The system may determine a highest assigned index from the initial index when a quantity of indices assigned from the initial index matches a quantity (Continued)

of messages populated within the range. The system may indicate that the computed range of messages in the contiguous message array is ready to be consumed.

20 Claims, 6 Drawing Sheets

(56) References Cited

U.S. PATENT DOCUMENTS

| | | | | |
|---|---|---|---|---|
| 2011/0280186 | A1* | 11/2011 | Rasquinha | H03M 13/275 370/328 |
| 2013/0297869 | A1* | 11/2013 | Mills | G06F 3/0674 711/112 |
| 2013/0326491 | A1* | 12/2013 | Caira | G06F 8/48 717/146 |
| 2015/0019766 | A1* | 1/2015 | Lin | G06F 5/14 710/53 |
| 2015/0036005 | A1* | 2/2015 | Kelly | H04N 5/2355 348/208.1 |

OTHER PUBLICATIONS

Rahul Manghwani, et al., "Scalable Memory Allocation", 2011, pp. 1-13, New York University.

* cited by examiner

DYNAMIC RANGE-BASED MESSAGING

BACKGROUND

Conventional computer systems may include multiple processors that operate in parallel to execute multiple different programs or execution threads. Multi-threaded execution environments typically control the flow of work requests via a queue. A queue of execution threads may in some cases be described as a logically circular contiguous array, where the producers and consumers of the work requests use an array index to identify a particular work request. In multi-threaded environments, multiple work requests may be identified by using a "two-tuple" of a start-index value and an end-index value to specify a "range" of contiguous array indices.

However, conventional array-based solutions for tracking execution threads may experience a performance bottleneck when attempting to compute the next available array index for a range of array indices for multi-thread execution environments. Common solutions typically rely on either a "worker thread" or statically allocated index ranges. For example, if all work requests are processed by a single worker thread, then the system may guarantee that the next available array index is unique while multiple threads are being serviced. One disadvantage of this mechanism is that the worker thread is event driven and thus must sleep and wake up, thereby negatively affecting aggregate system performance due to latency. Another disadvantage is that the multithreaded clients of the worker-thread will also experience unnecessary serialization for a portion of their work request processing.

Similarly, if a multi-threaded processing implementation chooses to statically allocate ranges of array indices then two issues may arise. One issue is the need to calculate what size all of the ranges should be. Another issue is deciding what happens if there are not enough work requests in the input stream to completely fill a range. Conventional systems typically attempt to address the first issue by allowing a user to coarsely "tune" the range size by modifying a documented program variable. Conventional systems may attempt to address the second issue by arming a timer that may flush a range if the range is only partially filled. However, both of these attempts to solve their respective issues typically fail due to the static nature of the range size and the timeout duration of the system. When using conventional solutions, system administrators can only hope to specify tunable parameters that are "good enough" and thus the solutions will never be optimal.

SUMMARY

Methods and systems for dynamic range-based messaging via the aggregation of multithreaded work requests are disclosed. In one embodiment, a system may include one or more processors and a memory connected to the one or more processors. The memory may include program instructions executable by the one or more processors to implement a dynamic range-based messaging system configured to receive, from respective producers of multiple producers, requests for indices to add respective messages to a contiguous message array. The system may assign, to the respective producers, next available indices of the contiguous array. The system may populate the contiguous message array with messages from the respective producers at respective assigned indices. The system may compute a range of messages in the contiguous message array ready to be consumed, where the range starts at an initial index for the range. The system may compute a highest assigned index from the initial index when a quantity of indices assigned from the initial index matches a quantity of messages populated within the range. Additionally, the system may indicate that the computed range of messages in the contiguous message array is ready to be consumed.

In one embodiment, the dynamic range-based messaging system may be configured to increment a counter value when respective ones of the next available indices are assigned to the respective producers, and decrement the counter value when the contiguous message array is populated with messages from the respective producers. In another embodiment, the system may include a memory configured to store multiple counter values, such that the system may increment a first counter value for a quantity of indices assigned to the respective producers each time one of the next available indices is assigned to one of the respective producers and increment a second counter value for a quantity of messages populated in the contiguous message array each time the contiguous message array is populated with a respective message from one of the producers, where the system may be configured to determine that the quantity of indices assigned from the initial index matches the quantity of messages populated within the range based on the first counter value matching the second counter value. In one embodiment, to compute the range the system may determine the highest assigned index of continuously assigned indices from the initial index in response to one or both of the range reaching a maximum range size or a computation time of the range exceeding a maximum range computation time threshold value. In an embodiment, the system may populate the contiguous message array with messages at the respective assigned indices in a different order than the respective assigned indices were received. In one embodiment, the system may compute multiple ranges having different range sizes, where the different range sizes may vary based, at least in part, on one or both of a rate that next available indices are assigned to the respective producers or a rate that respective messages are populated in the contiguous message array. In an embodiment, the system may indicate that the computed range of messages is ready to be consumed by sending a notification of the computed range to respective consumers of multiple consumers.

In an embodiment, a method for dynamic range-based messaging may include receiving, from respective producers of multiple producers, requests for indices to add respective messages to a contiguous message array. The method may include assigning, to the respective producers, next available indices of the contiguous array. The method may include populating the contiguous message array with messages from the respective producers at respective assigned indices. The method may include computing a range of messages in the contiguous message array ready to be consumed, where the range starts at an initial index for the range. The method may include computing a highest assigned index from the initial index when a quantity of indices assigned from the initial index matches a quantity of messages populated within the range. The method may also include indicating that the computed range of messages in the contiguous message array is ready to be consumed.

In one embodiment, a non-transitory, computer-readable storage medium, may store program instructions that when executed by one or more processors cause the one or more processors to implement a dynamic range-based messaging system configured to receive, from respective producers of multiple producers, requests for indices to add respective messages to a contiguous message array. The program instructions may be configured to cause the processors to assign, to the respective producers, next available indices of the contiguous array. The program instructions may be configured to cause the processors to populate the contiguous message array with messages from the respective producers at respective assigned indices. The program instructions may be configured to cause the processors to compute a range of messages in the contiguous message array ready to be consumed, where the range starts at an initial index for the range. The program instructions may be configured to cause the processors to compute a highest assigned index from the initial index when a quantity of indices assigned from the initial index matches a quantity of messages populated within the range. Additionally, the program instructions may be configured to cause the processors to indicate that the computed range of messages in the contiguous message array is ready to be consumed.

Figure 1:
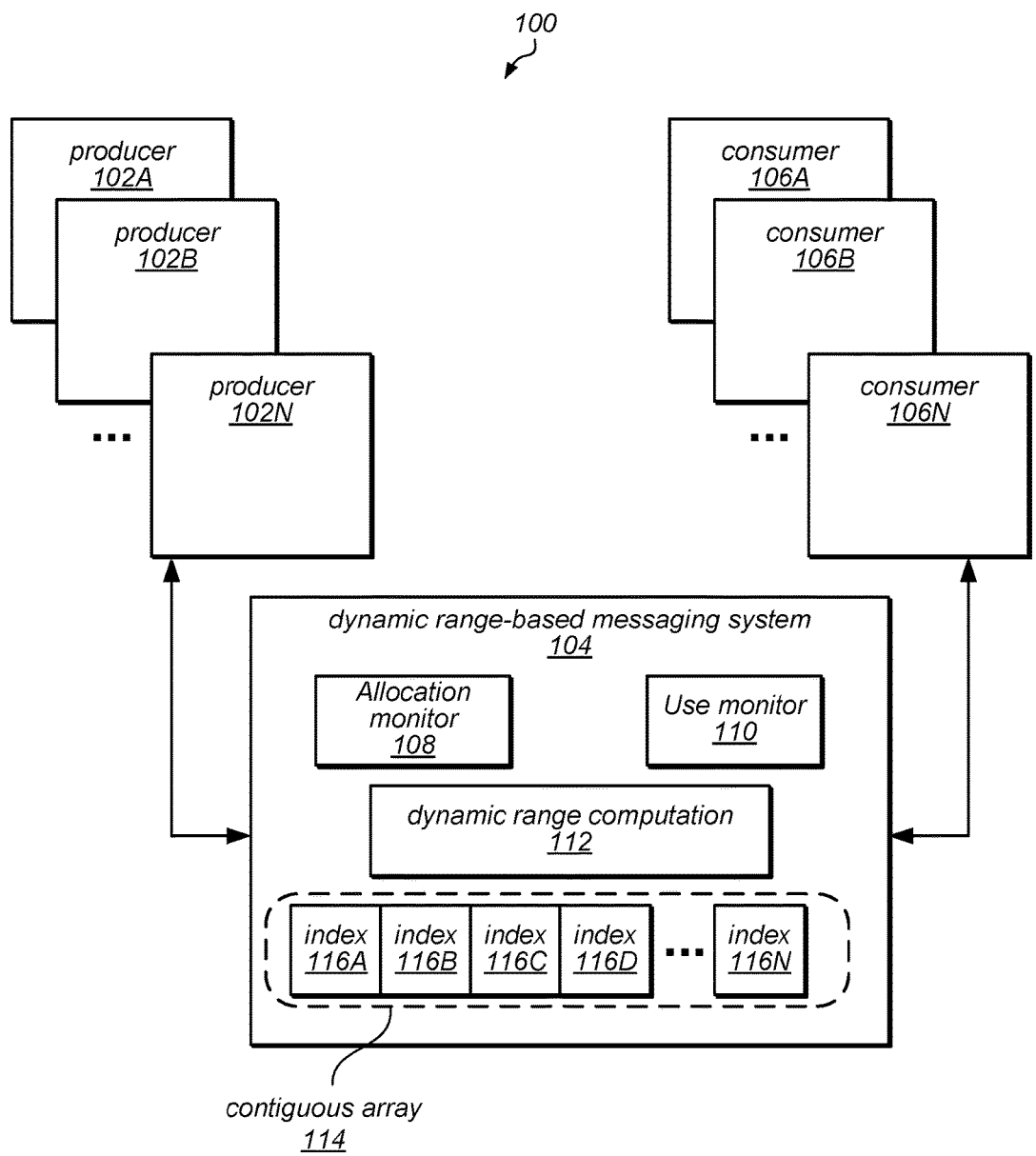
FIG. 1 is a logical block diagram illustrating an example computer system configured for dynamic range-based messaging, according to some embodiments.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

A processor may implement many different techniques or components for dynamic range-based messaging via the aggregation of multithreaded contiguous array elements that represent (i.e., correspond to) work requests. In order to improve the throughput (i.e., performance) of a messaging system, it is advantageous to reduce the communication/computation ratio of the system. In other words, if more work requests can be sent in the same communication message, then communication overhead may be reduced significantly. For example, if N requests are sent in each message, the communication overhead may be reduced by a factor of N. In one embodiment, a system may lower the communication-to-computation ratio by aggregating work requests via a dataflow-type algorithm, which leverages the "instantaneous available concurrency" resulting from the instantaneous combination of workload, system configuration, and system load.

In some embodiments, each array element may have three operations performed on it: Allocation, Use, and Deallocation. For example, for each array index, i, the Use operation of the array index, U(i), must occur after the thread-safe Allocation operation of the array index, A(i). Similarly, for a second array index, j, its U(j) and A(j) operations honor the same ordering constraint. However there is no ordering constraint between the pair of array indices themselves, other than the requirement that the first Allocation operation A(i) occurs before the second Allocation operation A(j). Therefore, a contiguous range of array indices may be computed in a thread-safe manner by using an algorithm configured to perform a computation only when the respective input arguments are available. For a Use operation, the salient input to the computation is the number of "unmatched" Allocation operations, where an Allocation operation may be unmatched if its peer Use operation has not been completed. Based, at least in part, on such an algorithm when the number of unmatched Allocation operations falls to zero, a contiguous range of array indices of a work request array has thereby been completed. In an embodiment, the system may compute a range of respective messages (from respective producers) that is ready to be consumed, where the range stars with an initial index and ends with a highest assigned index. In some embodiments, the system may compute the highest assigned index (and thereby compute the range) when a quantity of indices assigned from the initial index matches a quantity of messages added (i.e., populated) within the range of the array, where the range may be counted as starting from the initial index.

In various embodiments, the system may implement a scalable solution for dynamic range-based messaging in a multi-threaded execution environment by aggregating an array of work requests (e.g., requests for respective indices of locations of a contiguous array configured to store data corresponding to respective messages at respective locations of the array) via the use of a dataflow-type algorithm that leverages the instantaneous combination of workload, system configuration, and system load. The system may implement a queue of work requests to use a contiguous array, and the system may compute the next available array index for a range of array indices in a multi-threaded execution environment. The system may perform Allocation, Use, and/or Deallocation operations on one or more array elements. In an embodiment, each thread may perform a Use operation after the corresponding (i.e., associated) Allocation operation and thereby initialize metadata corresponding to the array, where the absolute time of a corresponding Allocation and Use operation may be a function of when the thread is scheduled. The time when a thread is scheduled may in turn be a function of static system characteristics, such as an amount of memory, a number of processors, and/or dynamic system characteristics like a rate at which a dynamic range-based messaging system receives requests from producers, a system load, or scheduler dispatch latency. In some embodiments, multiple different sets of work requests or multiple execution threads may be batched or otherwise aggregated into different respective ranges of a contiguous message array, such that different ranges may have different sizes (i.e., range size may differ between batches of aggregated messages). In an embodiment, the size of different ranges may vary based, at least in part, on various factors, such as the rate at which producers request array indices of locations to store messages in the contiguous message array and/or the rate at which the contiguous message array is being populated with data corresponding to messages. A dynamic range-based messaging system may thus adapt by scaling the range size based on system load.

Figure 2:
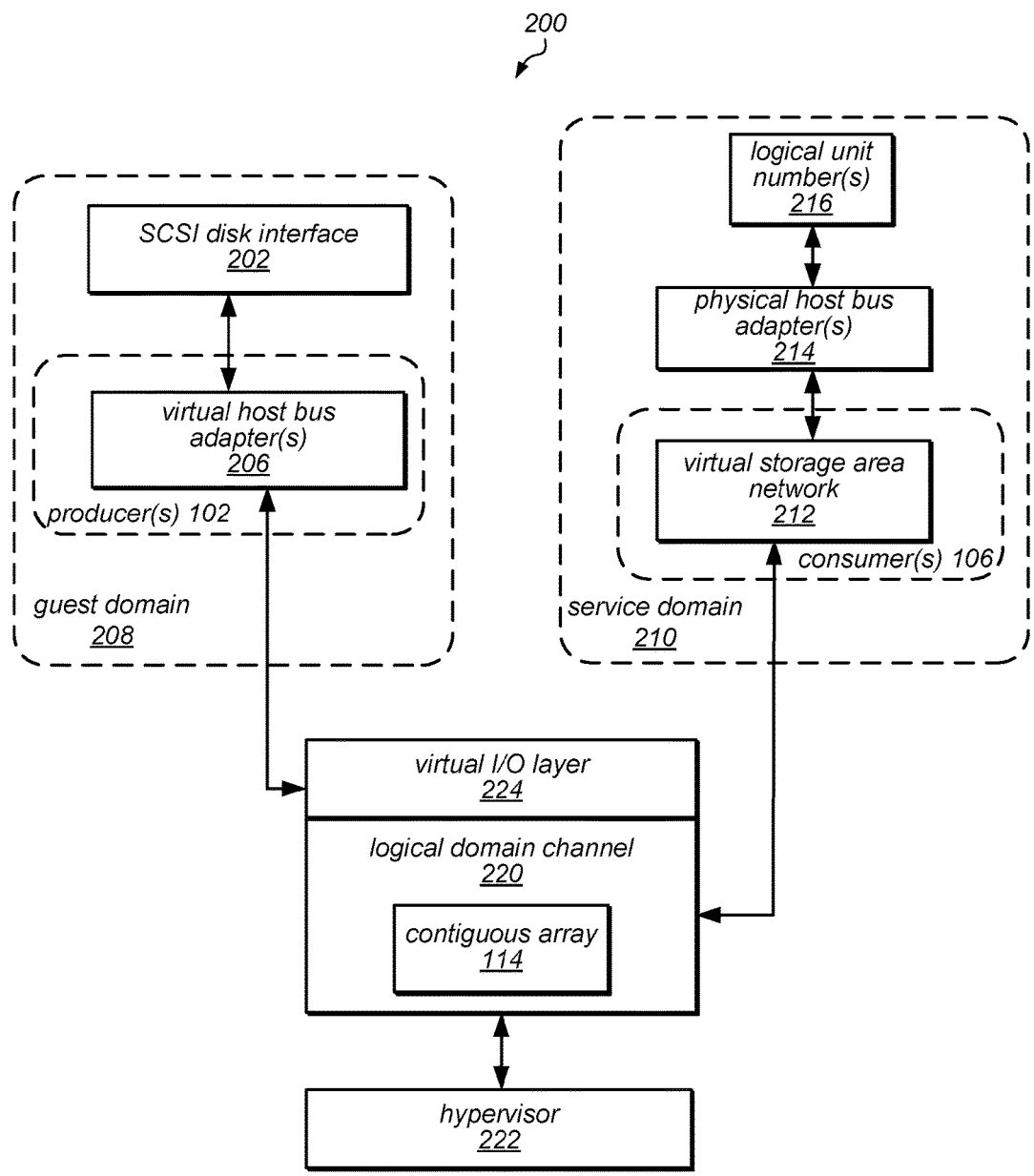
FIG. 2 is a logical block diagram illustrating an example computer system configured for dynamic range-based messaging, according to some embodiments.
Figure 6:
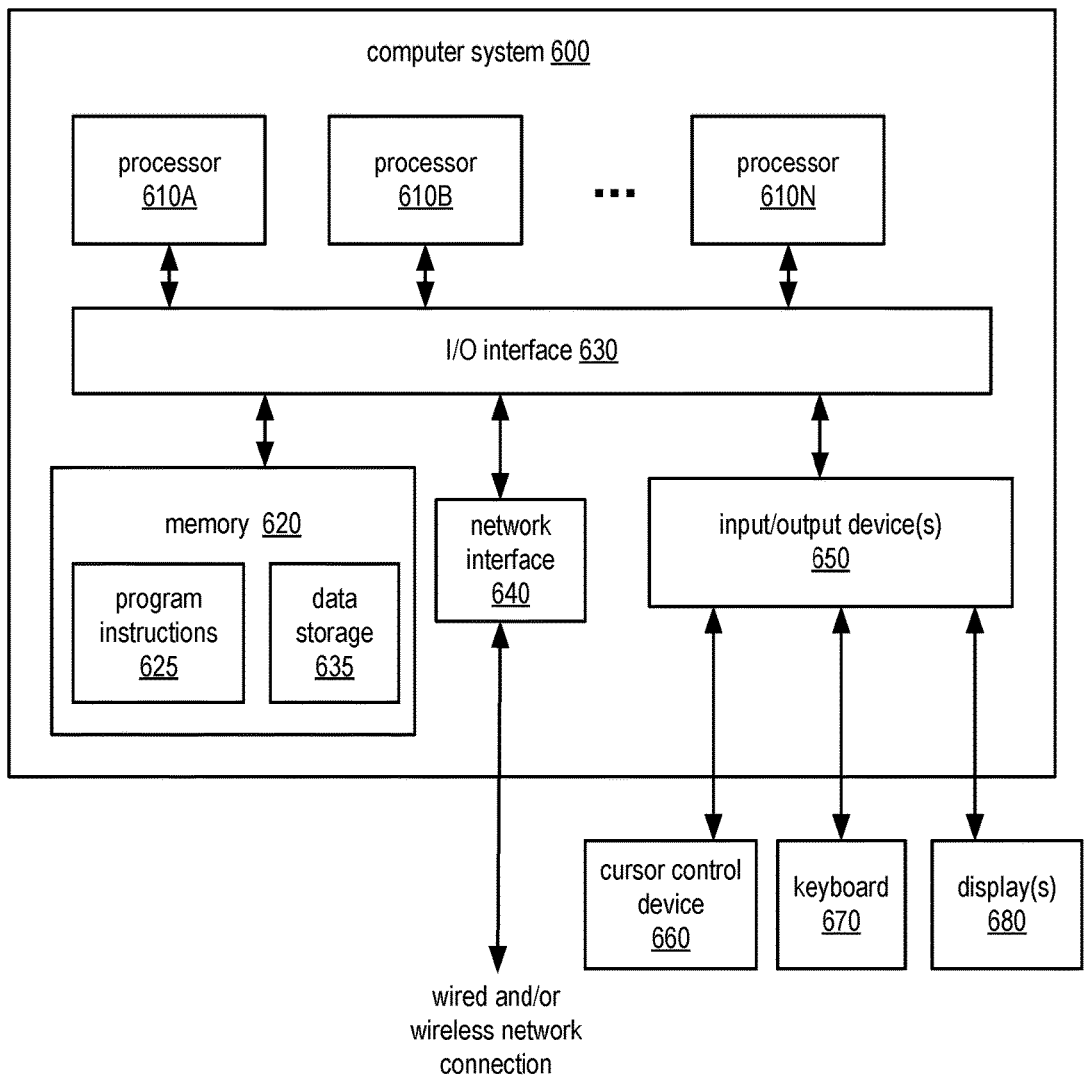
FIG. 6 is a logical block diagram illustrating an example computing device for dynamic range-based messaging, according to some embodiments This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIG. 1 is a logical block diagram illustrating an example system for dynamic range-based messaging, according to some embodiments. In one embodiment, system 100 may include one or more producer systems 102A-N connected to a dynamic range-based messaging system 104. In an embodiment, dynamic range-based messaging system 104 may also be connected to one or more consumer systems 106A-N. In various embodiments, producer systems 102A-N may include processors, computer systems, storage devices, input/output (I/O) devices, or virtual machines connected to a network. Similarly, consumer systems 106A-N may include one or more processors, computer systems, storage devices, I/O devices, computer systems, or virtual machines connected to a network. In an embodiment, producer systems 102A-N may be configured to generate one or more respective execution threads, processes, work requests, or the like, in a multi-threaded processing environment. In on embodiment, dynamic range-based messaging system 104 may include one or more components configured to perform various functions, such as an allocation monitor 108, a use monitor 110, dynamic range computation 112, and a contiguous array 114. Contiguous array 114 may include one or more array indices 116A-N. In some embodiments, contiguous array 114 may be stored in a shared system memory, as illustrated in FIG. 2 and FIG. 6, which are described in detail below.

In some embodiments, dynamic range-based messaging system 104 may be configured to monitor a flow of execution threads from one or more of producer systems 102A-N, dynamically assign the execution threads to respective ones of array indices 116A-N, and dynamically group (i.e., aggregate) one or more messages and/or execution threads into a batch (e.g., a range of array indices corresponding to locations within the contiguous message array populated with data of the respective messages and/or threads). In an embodiment, a respective one of producer systems 102A-N may write data (e.g., metadata, a message, or a work request) into an array element corresponding to an array index assigned to a respective Allocation operation sent by the respective producer system, and a Use operation corresponding to processing of the data (e.g., execution of the work request) may result in the Allocation operation being "matched" to the Use operation. Dynamic range-based messaging system 104 may thus provide an interlock between producer systems 102A-N and consumer systems 106A-N by monitoring Allocation and Use operations and grouping concurrent operations into a range of array indices (e.g., a batch of work requests represented by array indices).

In an embodiment, the ending array index of a given range may be a "last" or "highest" used array index corresponding to a message most recently populated in the contiguous message array for the given range. In other words, the ending array index of a given range may be the last message of a respective set (i.e., batch) of messages that was added into the contiguous array, during the computation of that given range. In some embodiments, the maximum size of a range may be limited based on a pre-defined maximum range size. In other embodiments, the maximum size of a range may be limited based, at least in part, on a time period corresponding to the processing, populating, or other computation of the range reaching a pre-defined maximum time threshold for range computation. In such embodiments, the dynamic range-based messaging system may compute the range by determining the highest assigned index of continuously assigned indices from the initial index in response to one or both of the range reaching a maximum range size or a computation time of the range exceeding a maximum range computation time threshold value. In other words, if a range gets too big and/or if too long of a time elapses while a range is being computed, the dynamic range-based computation system may pre-emptively batch (i.e., "close") that particular range by assigning the last or highest used array index for a set of matched Allocation and Use operations of the range (i.e., a continuously populated set of indices), batch that range, and then begin computing a new range for any un-matched and/or newly received messages, threads, or operations.

In an embodiment, dynamic range-based messaging system 104 may include program instructions stored in memory and executable to perform the functions corresponding to one or more system components, such as allocation monitor 108 and use monitor 110. In one embodiment, allocation monitor 108 and use monitor 110 may be configured to track requests, data, and/or messages from producer(s) 102A-N (e.g., a number of Allocation operations relative to a number of Use operations, respectively), and thereby provide data, such as one or more counter values, to a system component like dynamic range computation 112, thereby enabling dynamic range computation 112 to efficiently aggregate messages and/or execution threads in a thread-safe manner and notify consumer(s) 106A-N when the computed range of messages is ready for consumption. For example, dynamic range-based messaging system 104 may send a message including data corresponding to a batch of execution threads (e.g., a range of array indices corresponding to respective messages having data populated at respective locations within the range of indices of the contiguous message array) to one or more of consumer(s) 106A-N for consumption.

In one embodiment, dynamic range-based messaging system 104 may allocate array indices 116A-N based, at least in part, on an order in which Allocation operations are received from one or more of producer systems 102A-N. In some embodiments, dynamic range-based messaging system 104 may utilize a lock, a transactional memory, or a transactional protocol to ensure that data corresponding to messages and/or execution threads is allocated to indices 116A-N of contiguous array 114 in a thread-safe manner. In one embodiment, dynamic range-based messaging system 104 may empty or clear one or more indices of contiguous array 114 in response to one or more of consumer systems 106A-N successfully consuming data or messages populated in the contiguous message array (e.g., executing operations corresponding to the respective execution threads), thereby enabling portions of contiguous array 114 to be re-used for future execution threads. While in other embodiments, dynamic range-based messaging system 104 may cycle through contiguous array 114 over time by eventually writing over old data stored in array indices corresponding to messages and/or previously executed threads.

In an embodiment, allocation monitor 108, use monitor 110, and/or dynamic range computation 112 may use one counter value stored in memory, a register, or other storage structure, to track a number of Allocation operations relative to a number of Use operations for a current range of array indices. In one embodiment, allocation monitor 108, use monitor 110, and/or dynamic range computation 112 may use multiple counter values. For example, a first counter value dedicated to a current number of Allocation operations, and a second counter value dedicated to a current number of Use operations. In a multiple counter embodiment, the system may increment a first counter value for a quantity of indices assigned to the respective producers each time one of the next available indices is assigned to one of the respective producers and increment a second counter value for a quantity of messages populated in the contiguous message array each time the contiguous message array is populated with a respective message from one of the producers, where the system may be configured to determine that the quantity of indices assigned from the initial index matches the quantity of messages populated within the range based on the first counter value matching the second counter value FIG. 2 is a logical block diagram illustrating an example system for dynamic range-based messaging, according to some embodiments. In one embodiment, system 200 may include a guest domain 208 and a service domain 210, each of which may include one or more respective system components or modules configured to perform various functions as described in detail below. In an embodiment, system 200 may be configured similarly to system 100 of FIG. 1. For example, guest domain 208 may include one or more components or modules configured to perform the functions of producer systems 102A-N, and service domain 210 may include one or more components or modules configured to perform the functions of consumer systems 106A-N. In some embodiments, guest domain 208 and service domain 210 may be virtual domains within the same computer system, computer server, or other device. In other embodiments, guest domain 208 and service domain 210 may correspond to different computer systems, computer servers, or other devices connected via a computer network. In various embodiments, program instructions stored in the memory of a computer system may be executable to configure the computer system to perform the functions of guest domain 208 and service domain 210. In some embodiments, guest domain 208 and service domain 210 may be connected via a logical domain channel 220 and/or a virtual input/output (I/O) layer 224. In one embodiment, a hypervisor 222, which may be implemented in computer software, firmware, or hardware, may be connected to logical domain channel 220 and/or virtual I/O layer 224, and hypervisor 222 may be configured to perform various control functions corresponding to one or more system components or modules in guest domain 208 and/or service domain 210. For example, hypervisor 222 may be configured to reserve resources, such as hardware processors (e.g., central processing units (CPUs)) and to allocate respective physical memory corresponding to various system components or modules in guest domain 208 and/or service domain 210. In some embodiments, hypervisor 222 may configured similarly to dynamic range-based messaging system 104 of FIG. 1. In other embodiments, virtual I/O layer 224 may be configured to perform various control functions corresponding to logical domain channel 220, thereby providing dynamic range-based messaging services for one or more system components or modules in guest domain 208 and/or service domain 210. For example, virtual I/O layer 224 may coordinate the aggregation of messages or work requests from producer(s) 102A-N by interacting with contiguous array 114, logical domain channel 220, and/or hypervisor 222, in order to batch messages or work requests prior to sending the batched messages or work requests to consumer(s) 106 (i.e., prior to notifying the consumers that the computed range of messages is ready for consumption). In some embodiments, virtual I/O layer 224 may thus be configured perform the functions of dynamic range-based messaging system 104 of FIG. 1.

In one embodiment, guest domain 208 may include one or more virtual host bus adapter(s) (VHBAs) 206, connected to logical domain channel 220. In various embodiments, virtual host bus adapter 206 may be a virtual interface implemented by program instructions stored in the memory of a computer system, such as computer system 600 of FIG. 6 as described below. In an embodiment, VHBA(s) 206 may be connected to one or more small computer system interface (SCSI) compatible interfaces, such as SCSI disk interface 202. SCSI disk interface 202 may be configured to enable a computer system to communicate with one or more I/O device(s), such as hard disk drives (HDDs), solid state drives (SSDs), flash memory, thumb drives, displays, printers, keyboards, touchscreens, touchpads, or the like. In some embodiments, logical domain channel 220 may include a shared system memory configured to store one or more counter values corresponding to a number of unmatched Allocation operations received by virtual I/O layer 224 from producer(s) 102A-N. In other embodiments, a shared system memory may store one or more counter values in a memory accessible by virtual I/O layer 224 and/or logical domain channel 220. Examples of various memory devices are illustrated in computer system 600 of FIG. 6, which is discussed below.

In an embodiment, service domain 210 may include a virtual storage area network (VSAN) 212. VSAN 212 may include one or more virtual machines (e.g., virtual servers or other virtual computing devices). In one embodiment, service domain 210 may include one or more physical host bus adapters (PHBAs) connected to VSAN 212. PHBA(s) 214 may be implemented in program instructions stored in a shared memory of the computer system, where the program instructions are executable by one or more processors of the computer system to provide an interface to one or more logical unit number(s) 216 (e.g., an interface to one or more physical disk(s) connected to the computer system). In one embodiment, logical unit number(s) 216 may include various types of memory or storage devices, such as hard disk drives (HDDs), solid state drives (SSDs), flash memory, thumb drives, or the like. In an embodiment, logical unit number(s) (LUNs) 216 may include one or more physical storage disks or groups of disks corresponding to a disk volume, such as an array of disk storage devices or a memory array. Logical unit number(s) 216 may thus provide a virtual abstraction of storage capacity corresponding to various configurations of one or more physical disk storage devices. In various embodiments, virtual I/O layer 224 may be configured to produce data or commands that may be consumed by (i.e., stored by or utilized to direct operations of) one or more physical and/or virtual storage units connected to a computer system via physical host bus adapter(s) 214. For example, virtual I/O layer 224 may aggregate program instructions or data (e.g., array indices corresponding to data-requests in a multi-threaded processing environment) that may be sent by one or more processors (e.g., producer(s) 102A-N) and directed to logical unit number(s) 216 via VSAN 212 and physical host bus adapter(s) 214. Examples of virtual I/O layer 224 performing aggregation of multithreaded data requests for consumer(s) 106 are illustrated in FIGS. 3-6, which are discussed in further detail below.

Returning now to FIG. 2, in some embodiments VHBA(s) 206 may be configured to perform the functions of a producer of data in system 200 (e.g., the functions of producer(s) 102A-N of FIG. 1), while VSAN 212 may be configured to perform the functions of a consumer of data (e.g., the functions of consumer(s) 106A-N of FIG. 1). In one embodiment, virtual I/O layer 224 and/or logical domain channel 220 may be implemented by a portion of an operating system (OS) kernel configured to perform dynamic range-based messaging via the aggregation of multithreaded contiguous array elements corresponding to work requests. For example, VSAN 212 may provide an interface through physical host bus adapter(s) 214 for one or more physical devices, such as storage devices or disk drives. In one embodiment, virtual I/O layer 224 and/or logical domain channel 220 may be configured to perform the functions illustrated in FIGS. 3-5, which are discussed in detail below. For example, virtual I/O layer 224 may send I/O requests from SCSI disk interface 202 to VSAN 212, thereby acting as a driver for PHBA(s) 214. In an embodiment, virtual I/O layer 224 and/or logical domain channel 220 may perform operations configured to drive an interconnected virtual storage network, such as a fibre channel network.

In an embodiment, each domain may include a separate instance of an operating system (OS). In one embodiment, hypervisor 222 may reserve resources (e.g., hardware processors or physical memory) for each domain or for each virtual machine in system 200. Hypervisor 222 may thus manage communications between virtual machines implemented by a computer system. In one embodiment, the domains (i.e., guest domain 208 and service domain 210) may talk using shared memory configured to perform the functions of logical domain channel 220, and logical domain channel 220 may be managed by hypervisor 222. In an embodiment, virtual I/O layer 224 and/or logical domain channel 220 may enforce data operations, such as interrupts, in response to a message arriving at a destination endpoint in service domain 210. In one embodiment, virtual I/O layer 224 may be implemented by processor-executable program instructions stored in a memory accessible by hypervisor 222 or logical domain channel 220. In an embodiment, virtual I/O layer 224 may be configured to provide an abstraction layer corresponding to logical domain channel 220. For example, one of producer(s) 102A-N, such as VHBA(s) 206, may utilize the abstraction provided by virtual I/O layer 224 as an interface to efficiently send and/or receive command instructions or data via logical domain channel 220 to one of consumer(s) 106A-N, such as VSAN 212. In one embodiment, virtual I/O layer 224 may interact with hypervisor 222 to facilitate the sending of data via logical domain channel 220 to storage devices connected to a computer system via the interface(s) provided by physical host bus adapter(s) 214 (e.g., to send data to or to retrieve data from logical unit number(s) 216). In various embodiments, virtual I/O layer 224 may utilize logical domain channel 220 to organize, aggregate, or control a flow of multithreaded data requests in a dynamic range-based messaging system, where the data requests are configured to be represented by array indices.

In an embodiment, work requests may be represented by a contiguous range of array indices. In one embodiment, virtual I/O layer 224 may be configured to perform one or more operations on each array element in a thread safe manner (i.e., perform operations on a queue of work requests) by interacting via logical domain channel 220 with VSAN 212, and the one or more operations may include Allocation operations, Use operations, or Deallocation operations. In an embodiment, a Use operation (e.g., U(i)) may correspond to a first array index (e.g., i), and the Use operation may occur after a thread-safe Allocation operation corresponding to the same array index (e.g., A(i)). In an embodiment, virtual I/O layer 224 may be configured to initialize metadata in an array in response to performing a Use operation, such that the metadata may correspond to the respective Allocation operation that corresponds to the Use operation. Similarly, a second array index (e.g., j) may follow an ordering constraint in which a Use operation (e.g., U(j)) may occur after a corresponding allocation operation (e.g., A(j)). However, in one embodiment there may not be an ordering constraint between the Use operations corresponding to various array indices, as long as the respective Allocation operations of each array index are performed in order. In other words, a first Allocation operation may be performed before a second Allocation operation (e.g., A(i) may occur prior to A(j)), but the respective first and second Use operations may occur in any order (e.g., A(j) may occur before or after A(i)).

In some embodiments, virtual I/O layer 224 may be configured to aggregate operations or perform computations based, at least in part, on when the respective input arguments become available (e.g., based at least in part on when data signals or program instructions are sent to virtual I/O layer 224 from SCSI disk interface 202 or producer(s) 102A-N(e.g., VHBA(s) 206). In an embodiment, the absolute time of a corresponding Allocation and Use operation pair may be a function of a time when the corresponding execution thread or program task is scheduled, which in turn may be a function of relatively static system characteristics (e.g., amount of memory, number of processors, hardware layout, or the physical location of system components) and dynamic system characteristics (e.g., system load or scheduler dispatch latency). An example of virtual I/O layer 224 aggregating various Allocation, Use, and Deallocation operations based, at least in part, on virtual I/O layer 224 and/or hypervisor 222 computing a contiguous range of array indices is illustrated in FIG. 3, which is discussed below.

Figure 3:
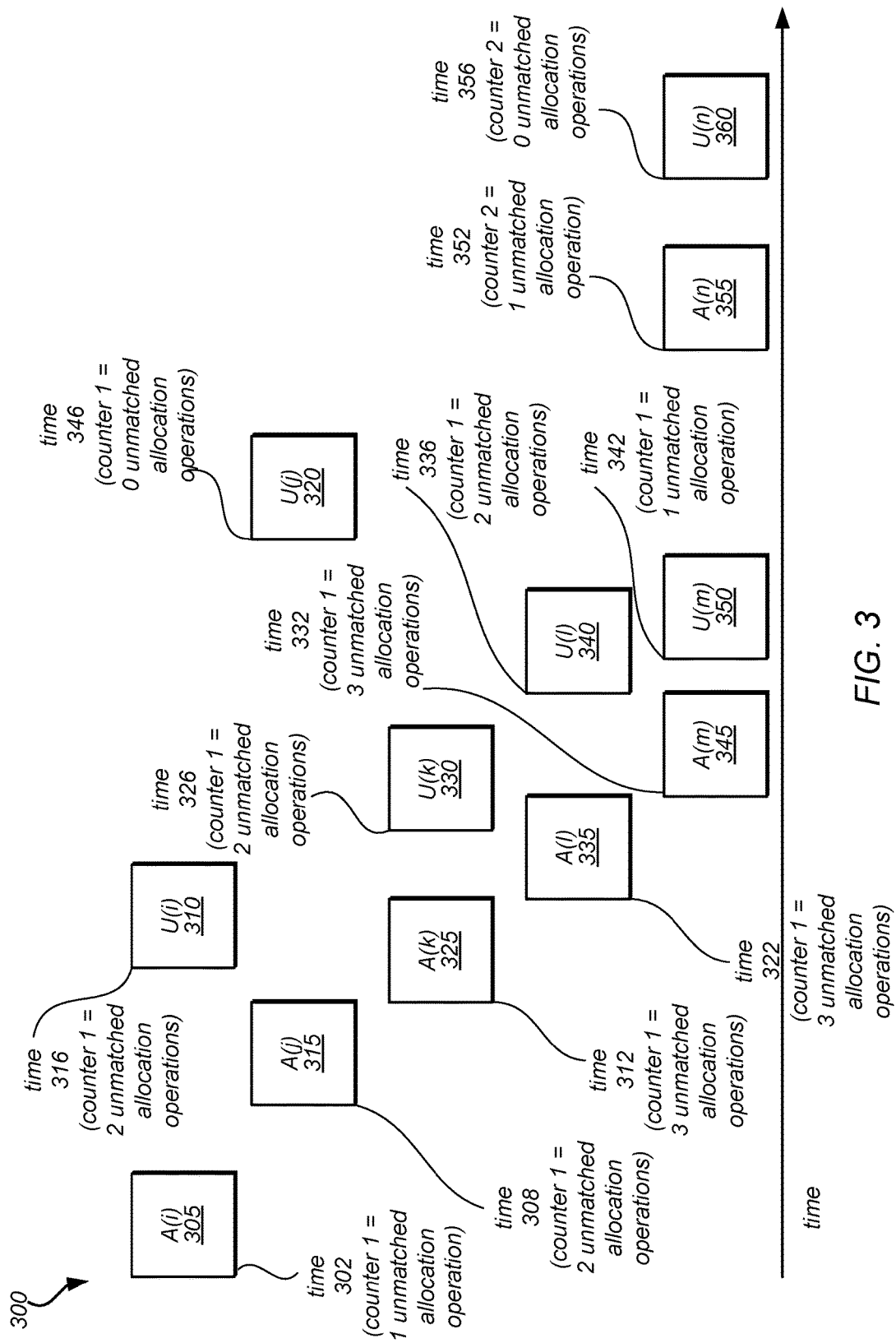
FIG. 3 is a logical block diagram illustrating an example of dynamic range-based messaging, according to some embodiments.

FIG. 3 is a logical block diagram illustrating an example of dynamic range-based messaging via the multithreaded aggregation of contiguous array elements, according to some embodiments. In one embodiment, virtual I/O layer 224 and/or hypervisor 222 of FIG. 2 may aggregate multithreaded work requests by computing a contiguous range of array indices corresponding to multiple work requests. In an embodiment, virtual I/O layer 224 may monitor multiple Use operations (e.g., U(i) through U(n)) and a number of "unmatched" respective Allocation operations in order to compute a contiguous range of corresponding array indices. In some embodiments, an Allocation operation may be considered to be unmatched if its peer Use operation has not completed. In one embodiment, an Allocation operation (e.g., A(j)) may be unmatched if its peer Use operation (e.g., U(j)) has not yet been issued. In an embodiment, an Allocation operation (e.g., A(j)) may be unmatched if its peer Use operation (e.g., U(j)) has not yet been executed. In one embodiment, an Allocation operation (e.g., A(j)) may be unmatched if its peer Use operation (e.g., U(j)) has not yet been processed.

In an embodiment, virtual I/O layer 224 may monitor Use operations and unmatched Allocation operations, and virtual I/O layer 224 may determine that when a number of unmatched Allocation operations falls to zero, a contiguous range of array indices has been computed, where the contiguous range of array indices thus corresponds to a contiguous set of respective messages (e.g., operations) from producers. In some embodiments, such a contiguous range of array indices may then be "batched" into an aggregated message configured to be sent to consumers via logical domain channel 220 from guest domain 208 to one or more storage devices in service domain 210 (e.g., logical unit number(s) 216 and/or physical disk(s) 218 connected to virtual network 212).

In the embodiment illustrated in FIG. 3, time flow diagram 300 may include a number (e.g., "n") of Allocation and Use operations corresponding to one or more producer messages corresponding to execution threads along a time axis, where the execution threads may be configured to perform each of the Use operations after a respective Allocation operation (e.g., Use operation U(i) may be performed after Allocation operation A(i)). In various embodiments, an execution thread may correspond to one Allocation-Use operation pair, while in other embodiments multiple Allocation-Use operation pairs may be included in an execution thread. In an embodiment, virtual I/O layer 224 may utilize one or more counter values stored in memory (e.g., memory 620 of FIG. 6 as discussed below) to track one or more particular numbers of unmatched Allocation operations corresponding to respective execution threads. In some embodiments, a counter value may be reset in response to all unmatched Allocation operations becoming matched (i.e., in response to a contiguous range of array indices being calculated). In other embodiments, multiple counters may be used, such that each counter may correspond to a respective set of execution threads or a respective range of contiguous array indices (i.e., separate counters for separate batches or messages).

In an embodiment, Allocation operation A(i) 305 may be issued at time 302, and a first counter value may be set to 1 in response to Allocation operation A(i) 305 being the first Allocation operation of an execution thread. At time 308, a second Allocation operation A(j) 315 may be issued, and the first counter may be increased to a value of 2 since both Allocation operation A(i) 305 and Allocation operation A(j) 315 are currently unmatched. Similarly, at time 312 a third Allocation operation A(k) 325 may be received by virtual I/O layer 224, and virtual I/O layer 224 may increment the first counter to a value of 3.

In one embodiment, at time 316 a first Use operation U(i) 310 may be received by virtual I/O layer 224, and virtual I/O layer 224 may decrement the first counter to a value of 2 since the first Allocation operation A(i) 305 is now "matched". As illustrated, at time 322 a fourth Allocation operation A(l) 335 may trigger virtual I/O layer 224 to increase the first counter to a value of 3 since a new unmatched Allocation operation has been received. However, at time 326, a Use operation U(k) 330 corresponding to the third Allocation operation A(k) 325 may be received by virtual I/O layer 224, thereby triggering virtual I/O layer 224 to decrement the counter value to a value of 2.

Note that the third Allocation operation A(k) 325 was originally received after the second Allocation operation A(j) 315, but the third Allocation operation A(k) 325 matched prior to the second Allocation operation A(j) 315 because the Use operation U(j) 320 corresponding to the second Allocation operation A(j) 315 has not yet been received by virtual I/O layer 224. In this embodiment, Allocation operations may be issued in order but may match out of order based, at least in part, in differences in the timing of their respective Use operations.

In an embodiment, at time 332 a fifth Allocation operation A(m) 345 may be received and may trigger virtual I/O layer 224 to increment the first counter to a value of 3. At time 336, Use operation U(l) 340 may be received, and virtual I/O layer 224 may decrease the first counter to a value of 2. Similarly, at time 342 Use operation U(m) 350 may be received by virtual I/O layer 224, thereby causing virtual I/O layer 224 to reduce the counter to a value of 1. Finally, at time 346, Use operation U(j) 320 may be received by virtual I/O layer 224, and virtual I/O layer 224 may decrement the first counter to a value of zero. In an embodiment, in response to determining that the counter has reached a value of zero (i.e., all Allocation operations have been matched) virtual I/O layer 224 may aggregate Allocation and Use operations i-m into a batch, format the batch as a message, and/or signal to other elements of system 200 that the number of unmatched Allocation operations has reached zero. Virtual I/O layer 224 may subsequently send a message including the batched operations via logical domain channel 220 (e.g., under the supervision of hypervisor 222) to one or more storage devices connected to virtual network 212.

In one embodiment, a new Allocation operation A(n) 355 may be received at time 352 by virtual I/O layer 224 after the number of unmatched Allocation operations in the first set has reached zero. In some embodiments, the new Allocation operation may correspond to a new execution thread of a multithreaded execution environment. In response to receiving the new Allocation operation A(n) 355, virtual I/O layer 224 may begin incrementing a second counter value configured to correspond to the new execution thread(s). For example, virtual I/O layer 224 may increment counter 2 to a value of 1. At time 356, virtual I/O layer 224 may receive a corresponding Use operation U(n) 360 and decrease the second counter to a value of zero, thereby signaling that the number of unmatched Allocation operations is again zero and that a new message corresponding to Allocation operation A(n) 355 and Use operation U(n) 360 may be generated (e.g., batched) and sent via logical domain channel 220 to multiple storage devices in service domain 210.

In an embodiment, the virtual I/O layer 224 may include a storage structure configured to store data, such as one or more counter values, corresponding to respective sets of multiple execution threads. For example, virtual I/O layer 224 may begin incrementing a second counter value in parallel to a first counter value in response to a second set of execution threads being received by virtual I/O layer 224 from one or more producer(s) 102A-N while a first set of multiple execution threads is still being processed by virtual I/O layer 224. For example, the dynamic range-based messaging system may assign a first next available message index to a first producer for a first message and then assign, prior to populating the contiguous array with the first message, a second next available message index to a second producer for a second message. The second message may thus overlap or be, at least in part, in parallel with the first message since the first message has been allocated but not yet used by the time the second message gets allocated. In other words, the dynamic range-based messaging system may be configured to assign next available indices of the contiguous message array to respective producers and to populate the contiguous message array with messages at the respective assigned indices in a different order than the respective assigned indices were received.

In one embodiment, if the dynamic range-based messaging system is nearing the computation of a first range (e.g., waiting on one last message of a first range to be populated, or otherwise has not yet indicated that a first range is ready to be consumed) when work requests for a second range begin to be received, then the system may store the requests and/or messages of the second range temporarily until the system has indicated that the first range is ready to be consumed. In other words, if a first range is almost, but not quite, ready and additional work requests are received, then the system may effectively decide to start queueing the new requests and/or messages, thereby effectively deferring processing of a second range until a time when the first range has been batched for consumption. In one embodiment of the above example, the system may store the messages of the second range temporarily in a cache, queue, or other memory. In another embodiment, the system may store the messages of the second range in a different section of the contiguous array than the section of the array used for the first range.

Please note that FIG. 3 is provided as merely an example of dynamic range-based messaging. Different combinations of the illustrated components (as well as components not illustrated) may be used to perform the aggregation of array indices corresponding to multithreaded work requests into a contiguous array. For example, in some embodiments combinations of hardware and software may be implemented. Thus, the components of FIG. 3 and their respective layout or ordering is not intended to be limiting to the various other combinations which may be used by dynamic range-based messaging system 104 of FIG. 1, virtual I/O layer 224 of FIG. 2, and/or hypervisor 222 of FIG. 2 to aggregate array indices corresponding to multithreaded work requests.

Figure 4:
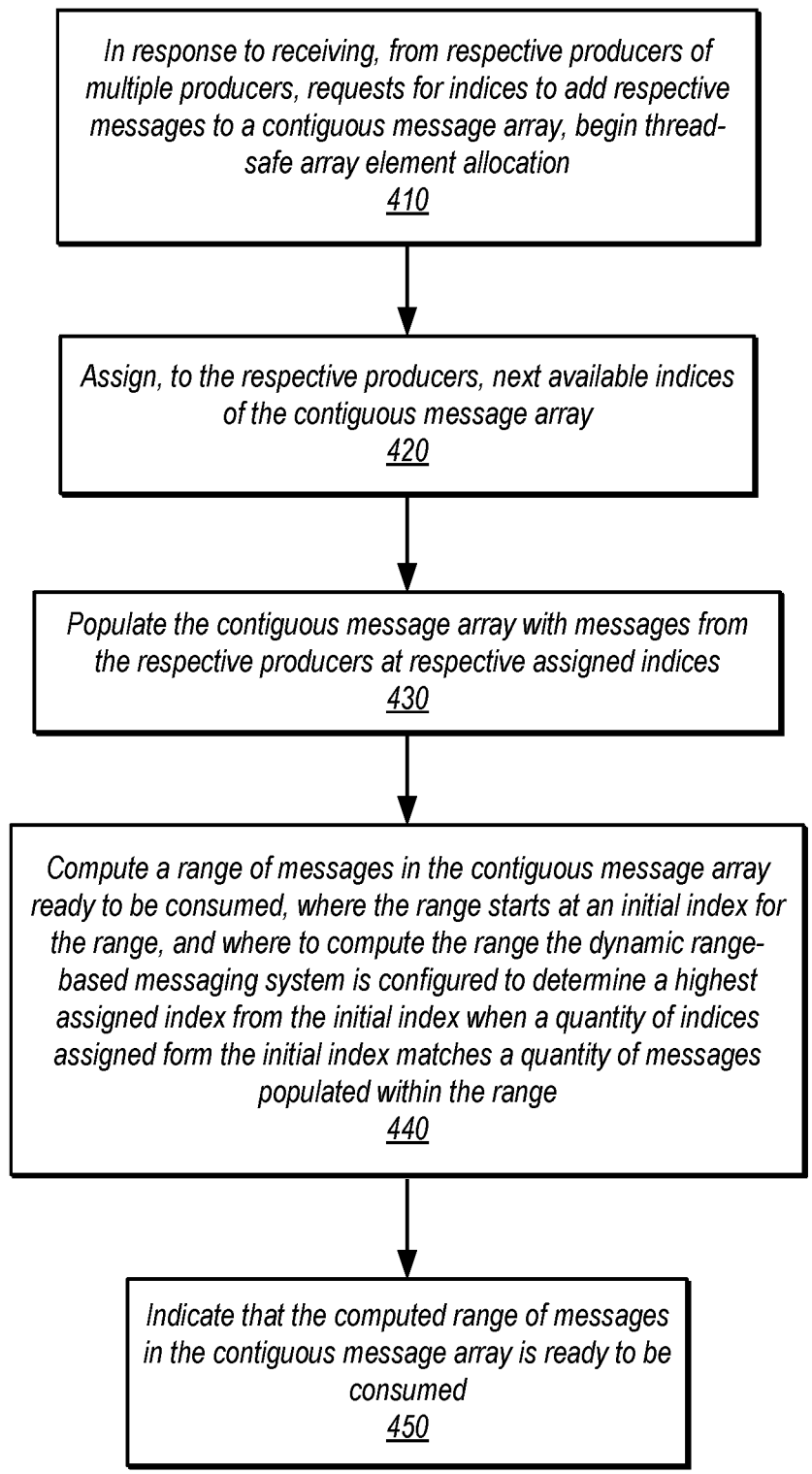
FIG. 4 is a high-level flowchart illustrating various methods and techniques for dynamic range-based messaging, according to some embodiments.
Figure 5:
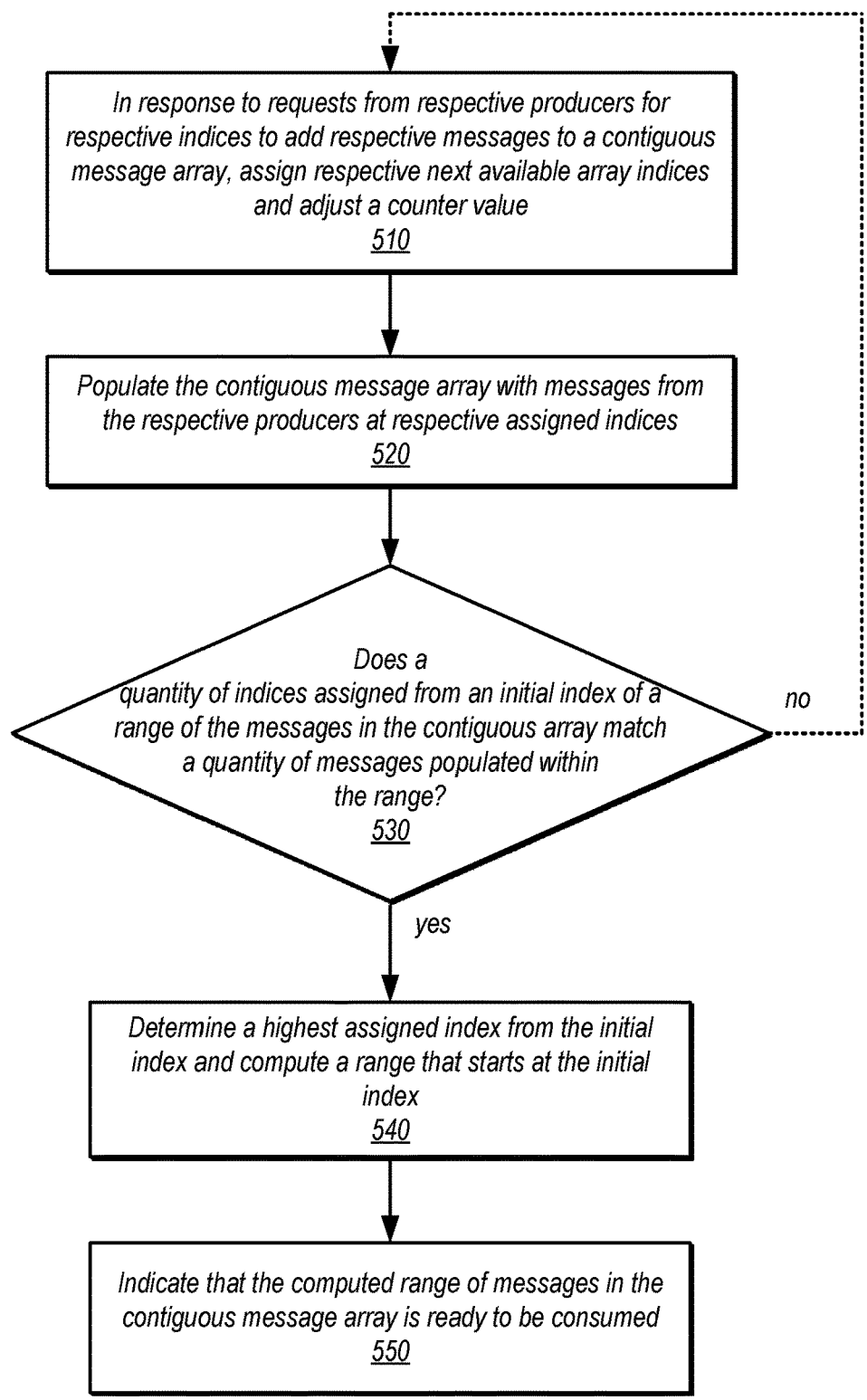
FIG. 5 is a high-level flowchart illustrating various methods and techniques for dynamic range-based messaging, according to some embodiments.

FIGS. 1-3 and 6 provide examples of dynamic range-based messaging via the aggregation of multithreaded work requests. However, numerous other types or configurations of systems or devices may implement dynamic range-based messaging and multithreaded aggregation of contiguous array elements. FIGS. 4 and 5 are high-level flowcharts illustrating various methods and techniques for dynamic range-based messaging according to some embodiments. The various components described above may implement these techniques, as well as various other hardware circuits, processors, and/or program instructions executed by processors.

FIG. 4 is a high-level flowchart illustrating various methods and techniques for dynamic range-based messaging according to some embodiments. As indicated at block 410, the method may include beginning a thread-safe array element allocation in response to receiving (e.g., at dynamic range-based messaging system 104 of FIG. 1 or at virtual I/O layer 224 of FIG. 2) requests from multiple producer systems (e.g., producer(s) 102A-N) for indices to add respective messages to a contiguous message array (e.g., contiguous array 114). As depicted in block 420, the method may include assigning, to the respective producers, next available indices of the contiguous message array. In various embodiments, dynamic range-based messaging system 104 or virtual I/O layer 224 may compute a next available array index. In some embodiments, the method may include incrementing a counter value, which may include incrementing a master counter value or incrementing a counter value corresponding to a number messages received from one or more of producer(s) 102A-N. In some embodiments, the counter value may correspond to a number of Allocation operations from one or more of producer(s) 102A-N.

As depicted in block 430, the method may include populating the contiguous message array with messages from the respective producers at respective assigned indices. As indicated at block 440, the method may include dynamic range-based messaging system 104 or virtual I/O layer 224 computing a range of messages in the contiguous message array ready to be consumed. In various embodiments, the range may start (i.e., begin) at an initial index for the range, and to compute the range the dynamic range-based messaging system may be configured to compute a highest assigned index from the initial index when a quantity of indices assigned from the initial index matches a quantity of messages populated within the range. As indicated at block 450, the method may include indicating that the computed range of messages in the contiguous message array is ready to be consumed.

FIG. 5 is a high-level flowchart illustrating various methods and techniques for dynamic range-based messaging according to some embodiments. In one embodiment, a system, such as dynamic range-based messaging system 104 of FIG. 1 and/or virtual I/O layer 224 of FIG. 2, may use multiple counters stored in a shared system memory to track messages and/or requests corresponding to Allocation and Use operations, respectively. In a multiple counter embodiment, the system may increment a first counter value for a quantity of indices assigned to the respective producers each time one of the next available indices is assigned to one of the respective producers and increment a second counter value for a quantity of messages populated in the contiguous message array each time the contiguous message array is populated with a respective message from one of the producers, where the system may be configured to determine that the quantity of indices assigned from the initial index matches the quantity of messages populated within the range based on the first counter value matching the second counter value. In other embodiments, dynamic range-based messaging system 104 and/or virtual I/O layer 224 may use a single "master" counter stored in a shared system memory to track messages corresponding to operations of producer(s) 102A-N. In a single counter embodiment, the system may increment a counter value when respective ones of the next available indices are assigned to the respective producers, and decrement the counter value when the contiguous message array is populated with messages from the respective producers.

As indicated at block 510, the method may include assigning respective next available array indices, in response to requests from respective producers for respective indices to add respective messages to a contiguous message array, and adjusting a counter value corresponding to a number (i.e., quantity) of messages (e.g., messages of producer(s) 102A-N). For example, dynamic range-based messaging system 104 of FIG. 1 and/or virtual I/O layer 224 may receive a request from one or more of producer(s) 102A-N to put a message at an index of contiguous array 114 and then assign respective next available array indices to the producers. In a single counter value embodiment, dynamic range-based messaging system 104 may decrement a master counter value in response to receiving a request to put a message at an index of contiguous array 114. In a multiple counter embodiment, dynamic range-based messaging system 104 may increment a counter corresponding to Use operations in response to receiving a request to put a message at an index of contiguous array 114. For example, in response to dynamic range-based messaging system 104, virtual I/O layer 224, or hypervisor 222 receiving notification of a message from one of producer(s) 102A-N, dynamic range-based messaging system 104, virtual I/O layer 224, or hypervisor 222 may adjust a counter value corresponding to a current number of messages, where the adjustment may correspond to decrementing a master counter value or incrementing a Use operation counter value in various embodiments. As described above, in some embodiments the different respective messages may correspond to Allocation operations or Use operations. As indicated at block 520, the method may include populating the contiguous message array (i.e., contiguous array 114) with messages and/or with other data (e.g., metadata) from the respective producers at respective assigned indices.

As indicated in block 530, the method may include determining whether a quantity of indices assigned from an initial index of a range of the respective messages matches a quantity of messages populated within the range, where the range starts with an initial index for the range. If not, then the process returns to block 510. If the quantity of indices assigned from the initial index matches a quantity of messages populated within the range (i.e., if all assigned indices have had respective messages added to the array) then the process proceeds to block 540. In some embodiments dynamic range-based messaging system 104, virtual I/O layer 224, or hypervisor 222 may compare the current values of the Use count and the Allocation count, while in other embodiments dynamic range-based messaging system 104, virtual I/O layer 224, or hypervisor 222 may check the current value of a single master counter value to determine if the master counter value has reached zero. If the number of Use operations has not matched the number of Allocation operations (i.e., if the Use count is not equal to the Allocation count, or if the master counter value is not equal to zero, there are still unmatched Allocation operations), then the process returns to block 510. Once the number of Use operations matches the number of Allocation operations, the process proceeds to block 540.

As shown in block 540, the method may include determining a highest assigned index from the initial index and thus computing a range that starts at the initial index and ends at the highest index. For example, the dynamic range-based messaging system may compute a beginning array index (i.e., a start index) and an ending array index corresponding to the populated/added messages in the contiguous message array. As indicated at block 550, the method may include indicating that the computed range of messages in the contiguous message array is ready to be consumed.

In some embodiments the number of messages (and thus array indices) in the current range of the contiguous array may correspond to the relationship between the beginning and ending array indices, such that the beginning and ending array indices are configured to identify the respective positions in an array (e.g., a contiguous or circular array) that correspond to the messages stored in the array from producer(s) 102A-N that are being aggregated, batched, or bundled by dynamic range-based messaging system 104, virtual I/O layer 224, or hypervisor 222. In various embodiments, examples of data stored in the array for each respective array index assigned to a respective Allocation operation include metadata, an instruction, a message, processed data (i.e., computation results), or a work request corresponding to the respective messages and/or respective Allocation operations. As depicted in block 550, the method may include indicating to one or more respective consumers, such as consumer(s) 106A-N, that the messages in the contiguous message array corresponding to the current range between the beginning array index and the ending array index of the array are ready for consumption. In some embodiments, the indicating may include dynamic range-based messaging system 104, virtual I/O layer 224, and/or hypervisor 222 batching the respective array indices of the current range of the contiguous array into an aggregated message and sending the message of batched array indices to the respective consumers, thereby notifying the consumers that the computed range is ready for consumption.

Various components of embodiments of the techniques and methods described herein for dynamic range-based messaging may be executed on one or more computer systems or computing devices, which may interact with various other devices. One such computer system or computing device is illustrated by FIG. 6. In the illustrated embodiment, computer system 600 includes one or more processor(s) 610A-N coupled to a system memory 620 via an input/output (I/O) interface 630. Computer system 600 further includes a network interface 640 coupled to I/O interface 630, and one or more input/output devices 650, such as cursor control device 660, keyboard 670, audio device 690, and display(s) 680. In some embodiments, it is contemplated that embodiments may be implemented using a single instance of computer system 600, while in other embodiments multiple such systems, or multiple nodes making up computer system 600, may be configured to host different portions, components, or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610A-N

(e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor(s) 610A-N. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for providing enhanced accountability and trust in distributed ledgers, are shown stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may be configured to coordinate I/O traffic between processor(s) 610A-N, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor(s) 610A-N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor(s) 610A-N.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement dynamic range-based messaging, and data storage 635, comprising various data accessible by program instructions 625. In one embodiment, program instructions 625 may include software elements of embodiments of the methods for providing dynamic range-based messaging, as illustrated in the above Figures. Data storage 635 may include data that may be used in embodiments. In other embodiments, other or different software elements and data may be included. In some embodiments, processor(s) 610A-N may be configured to execute program instructions stored in memory 620, such that the program instructions may be configured to implement the various system components and modules illustrated in FIG. 1 and FIG. 2, as discussed above. For example, processor(s) 610A-N may be configured to execute program instructions configured to implement producer(s) 102A-N, dynamic range-based messaging system 104, and consumer(s) 106A-N of FIG. 1. Similarly, processor(s) 610A-N may be configured to execute program instructions configured to implement guest domain 208, virtual I/O layer 224, logical domain channel 220, hypervisor 222, and service domain 210 of FIG. 2.

Those skilled in the art will appreciate that computer system 600 is merely illustrative and is not intended to limit the scope of the methods for dynamic range-based messaging as described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 600 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. In some embodiments, various functions may be performed by software components executing in memory on another device and communicating with the illustrated system via inter-computer communication. Some or all of these software components or any data structures described herein may be stored (e.g., as instructions or structured data) in memory 620, in data storage 635, or may be stored on a non-transitory computer-readable medium or a portable article to be read by an appropriate drive. In some embodiments, instructions stored on a computer-accessible medium separate from computer system 600 may be transmitted to computer system 600 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

A system for dynamic range-based messaging via the multithreaded aggregation of contiguous array elements that correspond to work requests may be configured to allocate a contiguous range of array indices in a thread-safe manner. In an embodiment, configuring the sizing of the array ranges to be a function of the workload, system configuration, and system load makes the solution scalable (e.g., per available memory, per software and/or hardware threads, per processors, or the like). Such an approach does not consume extra resources, such as for instance vs. the synchronization overhead of an "out of band" worker thread or the processing of a sub-optimally tuned set of static array ranges.

By leveraging the current workload (e.g., the rate at which array indices are assigned and/or the rate at which messages are added to the contiguous array), system configuration, and other aspects of a system's load, various embodiments described above allow the aggregate runtime environment to determine how much concurrency and parallelism is seen by the code. For example, if the workload is single-threaded, then access to array index i and array index j will be serialized, and single element array ranges will be computed. If the workload is not single-threaded and the system configuration has more than one processor, then it is likely that multiple-element ranges will be computed, thereby lowering the communication-to-computation ratio. The embodiments of the algorithms discussed above thus create a provably scalable solution as opposed to a conventional heuristic. The embodiments discussed above lower the communication/computation ratio as a function of application workload, system configuration, and system load by using algorithms that do not require tunable parameters. Such a system may be configured to aggregate as many work requests into a message as are instantaneously available by computing a range of respective messages of the contiguous array that is ready to be consumed. The system may compute a highest index of the range by computing a quantity of indices assigned from an initial index of the range matches a quantity of messages populated within the range. The system may thus be considered to be "instantaneously ideal" and may be applicable wherever batching of work requests is needed. Additionally, a system for dynamic range-based messaging neither favors nor penalizes single-threaded or multi-threaded execution environments.

What is claimed is:

1. A system, comprising:
   one or more processors;
   a memory connected to the one or more processors, wherein the memory comprises program instructions executable by the one or more processors to implement a dynamic range-based messaging system configured to:
   receive, from respective producers of a plurality of producers, requests for indices to add respective messages to a contiguous message array;
   assign, to the respective producers, next available indices of the contiguous message array;
   populate the contiguous message array with messages from the respective producers at respective assigned indices;
   compute a range of messages in the contiguous message array ready to be consumed,
       wherein the range starts at an initial index for the range; and
       wherein to compute the range the dynamic range-based messaging system is further configured to determine a highest assigned index from the initial index when a quantity of indices assigned from the initial index matches a quantity of messages populated within the range, wherein the highest assigned index is used as an end index for the range; and
   indicate that the computed range of messages in the contiguous message array is ready to be consumed.

2. The system of claim 1, wherein the dynamic range-based messaging system is further configured to:
   increment a counter value each time one of the next available indices is assigned to one of the respective producers; and
   decrement the counter value each time the contiguous message array is populated with a respective message from one of the producers;
   wherein the dynamic range-based messaging system is configured to determine that the quantity of indices assigned from the initial index matches the quantity of messages populated within the range based on the counter reaching zero after the initial index has been assigned.

3. The system of claim 1, wherein the dynamic range-based messaging system is further configured to:
   increment a first counter value for a quantity of indices assigned to the respective producers each time one of the next available indices is assigned to one of the respective producers; and
   increment a second counter value for a quantity of messages populated in the contiguous message array each time the contiguous message array is populated with a respective message from one of the producers;
   wherein the dynamic range-based messaging system is configured to determine that the quantity of indices assigned from the initial index matches the quantity of messages populated within the range based on the first counter value matching the second counter value.

4. The system of claim 1, wherein to compute the range the dynamic range-based messaging system is configured to determine the highest assigned index of continuously assigned indices from the initial index in response to one or both of:
   the range reaching a maximum range size; or
   a computation time of the range exceeding a maximum range computation time threshold value.

5. The system of claim 1, wherein to populate the contiguous message array with messages at the respective assigned indices the dynamic range-based messaging system is further configured to:
   populate the contiguous message array with messages at the respective assigned indices in a different order than the respective assigned indices were received.

6. The system of claim 1, wherein the dynamic range-based messaging system is further configured to compute a plurality of ranges having different range sizes, wherein the different range sizes vary based, at least in part, on one or both of:
   a rate that next available indices are assigned to the respective producers; or
   a rate that respective messages are populated in the contiguous message array.

7. The system of claim 1, wherein to indicate that the computed range of messages is ready to be consumed the dynamic range-based messaging system is further configured to send a notification of the computed range to respective consumers of a plurality of consumers.

8. A method, comprising:
   performing, by a computer:
      receiving, from respective producers of a plurality of producers, requests for indices to add respective messages to a contiguous message array;
      assigning, to the respective producers, next available indices of the contiguous message array;
      populating the contiguous message array with messages from the respective producers at respective assigned indices;
      computing a range of messages in the contiguous message array ready to be consumed,
         wherein the range starts at an initial index for the range; and
         wherein to compute the range the computer is configured to determine a highest assigned index from the initial index when a quantity of indices assigned from the initial index matches a quantity of messages populated within the range; and
      indicating that the computed range of messages in the contiguous message array is ready to be consumed.

9. The method of claim 8, further comprising:
   incrementing a counter value each time one of the next available indices is assigned to one of the respective producers; and
   decrementing the counter value each time the contiguous message array is populated with the a respective message from one of the producers; and
   determining that the quantity of indices assigned from the initial index matches the quantity of messages populated within the range based on the counter reaching zero after the initial index has been assigned.

10. The method of claim 8, further comprising:
    incrementing a first counter value for a quantity of indices assigned to the respective producers each time one of the next available indices is assigned to one of the respective producers;
    incrementing a second counter value for a quantity of messages populated in the contiguous message array each time the contiguous message array is populated with a respective message from one of the producers; and
    determining that the quantity of indices assigned from the initial index matches the quantity of messages populated within the range based on the first counter value matching the second counter value.

11. The method of claim 8, wherein computing the range further comprises:
    determining the highest assigned index of assigned indices from the initial index before the quantity of indices assigned from the initial index matches the quantity of messages populated within the range in response to one or both of:
       the range reaching a maximum range size; or
       a computation time of the range exceeding a maximum range computation time threshold value; and
    wherein the computed range comprises continuously assigned indices from the initial index to the highest assigned index.

12. The method of claim 8, further comprising:
    populating the contiguous message array with messages at the respective assigned indices in a different order than the respective assigned indices were received.

13. The method of claim 8, further comprising computing a plurality of ranges having different range sizes, wherein the different range sizes vary based, at least in part, on one or both of:
    a rate that next available indices are assigned to the respective producers; or
    a rate that respective messages are populated in the contiguous message array.

14. The method of claim 8, wherein indicating that the computed range of messages is ready to be consumed comprises sending a notification of the computed range to respective consumers of a plurality of consumers.

15. A non-transitory, computer-readable storage medium, storing program instructions that when executed by one or more processors cause the one or more processors to implement a dynamic range-based messaging system configured to:
    receive, from respective producers of a plurality of producers, requests for indices to add respective messages to a contiguous message array;
    assign, to the respective producers, next available indices of the contiguous message array;
    populate the contiguous message array with messages from the respective producers at respective assigned indices;
    compute a range of messages in the contiguous message array ready to be consumed,
        wherein the range starts at an initial index for the range; and
        wherein to compute the range the dynamic range-based messaging system is further configured to determine a highest assigned index from the initial index when a quantity of indices assigned from the initial index matches a quantity of messages populated within the range; and
    indicate that the computed range of messages in the contiguous message array is ready to be consumed.

16. The non-transitory, computer-readable storage medium of claim 15, wherein the program instructions further cause the one or more processors to:
    increment a counter value each time one of the next available indices is assigned to one of the respective producers; and
    decrement the counter value each time the contiguous message array is populated with a respective message from one of the producers;
    wherein the dynamic range-based messaging system is configured to determine that the quantity of indices assigned from the initial index matches the quantity of messages populated within the range based on the counter reaching zero after the initial index has been assigned.

17. The non-transitory, computer-readable storage medium of claim 15, wherein the program instructions further cause the one or more processors to implement:
    incrementing a first counter value for a quantity of indices assigned to the respective producers each time one of the next available indices is assigned to one of the respective producers; and
    incrementing a second counter value for a quantity of messages populated in the contiguous message array each time the contiguous message array is populated with a respective message from one of the producers;
    wherein the program instructions further cause the one or more processors to determine that the quantity of indices assigned from the initial index matches the quantity of messages populated within the range based on the first counter value matching the second counter value.

18. The non-transitory, computer-readable storage medium of claim 15, wherein the program instructions further cause the one or more processors to determine the highest assigned index of continuously assigned indices from the initial index in response to one or both of:
    the range reaching a maximum range size; or
    a computation time of the range exceeding a maximum range computation time threshold value.

19. The non-transitory, computer-readable storage medium of claim 15, wherein the program instructions further cause the one or more processors to:
    populate the contiguous message array with messages at the respective assigned indices in a different order than the respective assigned indices were received.

20. The non-transitory, computer-readable storage medium of claim 15, wherein the program instructions further cause the one or more processors to implement computing a plurality of ranges having different range sizes, wherein the different range sizes vary based, at least in part, on one or both of:
    a rate that next available indices are assigned to the respective producers; or
    a rate that respective messages are populated in the contiguous message array.

* * * * *

UNITED STATES PATENT AND TRADEMARK OFFICE
CERTIFICATE OF CORRECTION

PATENT NO. : 10,073,723 B2  
APPLICATION NO. : 15/177253  
DATED : September 11, 2018  
INVENTOR(S) : Rutz Page 1 of 1

It is certified that error appears in the above-identified patent and that said Letters Patent is hereby corrected as shown below:

In the Specification

In Column 3, Line 39, after "embodiments" insert -- . --.

In Column 7, Line 60, after "value" insert -- . --.

In the Claims

In Column 22, Line 21, in Claim 9, delete "the a" and insert -- a --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*